(12) United States Patent
Ichihara

(10) Patent No.: US 10,511,784 B2
(45) Date of Patent: Dec. 17, 2019

(54) IMAGING APPARATUS AND CONTROL METHOD THEREFOR, AND EXTERNAL DEVICE

(71) Applicant: CANON KABUSHIKI KAISHA, Tokyo (JP)

(72) Inventor: Atsushi Ichihara, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/910,237

(22) Filed: Mar. 2, 2018

(65) Prior Publication Data

US 2018/0255223 A1 Sep. 6, 2018

(30) Foreign Application Priority Data

Mar. 2, 2017 (JP) .................................. 2017-039443

(51) Int. Cl.
*H04N 5/235* (2006.01)
*H04N 5/232* (2006.01)

(52) U.S. Cl.
CPC ......... *H04N 5/2353* (2013.01); *H04N 5/2327* (2013.01); *H04N 5/23209* (2013.01); *H04N 5/23212* (2013.01); *H04N 5/23245* (2013.01); *H04N 5/23258* (2013.01); *H04N 5/23261* (2013.01); *H04N 5/23264* (2013.01)

(58) Field of Classification Search
CPC ............. H04N 5/2353; H04N 5/23261; H04N 5/23212; H04N 5/23264
See application file for complete search history.

(56) References Cited

U.S. PATENT DOCUMENTS

| | | | |
|---|---|---|---|
| 2004/0160525 A1* | 8/2004 | Kingetsu | ............ H04N 5/23248 348/364 |
| 2007/0110418 A1* | 5/2007 | Imada | ...................... G03B 5/04 396/55 |
| 2010/0284676 A1* | 11/2010 | Shintani | ............... H04N 5/2354 396/175 |

FOREIGN PATENT DOCUMENTS

JP 2015-215553 A 12/2015

\* cited by examiner

*Primary Examiner* — Ahmed A Berhan
(74) *Attorney, Agent, or Firm* — Carter, DeLuca & Farrell LLP

(57) ABSTRACT

An imaging apparatus includes a shake detection unit in the main body and detects an amount of the shaking. A system control unit acquires frequency information by communication from an external device mounted on the main body. If the system control unit determines that a drive frequency of the external device mounted on the main body interferes with a drive frequency of the shake detection unit in a case where a mode that supports panning is set and panning of the imaging apparatus is performed, it corrects a shutter speed for panning and suppresses the influence caused by the interferences.

18 Claims, 12 Drawing Sheets

FIG 10B

| | | Focus adjustment control | | |
|---|---|---|---|---|
| | | Manual focus | Being focusing (Driving stopped) | Being driven (Normal driving) | Being driven (Double speed driving) |
| Image shake correction control | Incompatible | No correction | No correction | Correction coefficient: B<br>Correction amount: (b)<br>= 2×(a) |
| | Stopped | No correction | No correction | Correction coefficient: B<br>Correction amount: (a)+(c)<br>= 2×(a) |
| | Being driven | Correction coefficient: C<br>Correction amount: (a) | Correction coefficient: C<br>Correction amount: (a) | Correction coefficient: B<br>Correction amount: (a)+(c)<br>= 2×(a) | Correction coefficient: A<br>Correction amount: (a)+(b)<br>= 3×(a) |

※ Relation between correction amounts: (b) = 2×(c)
(c) = (a)

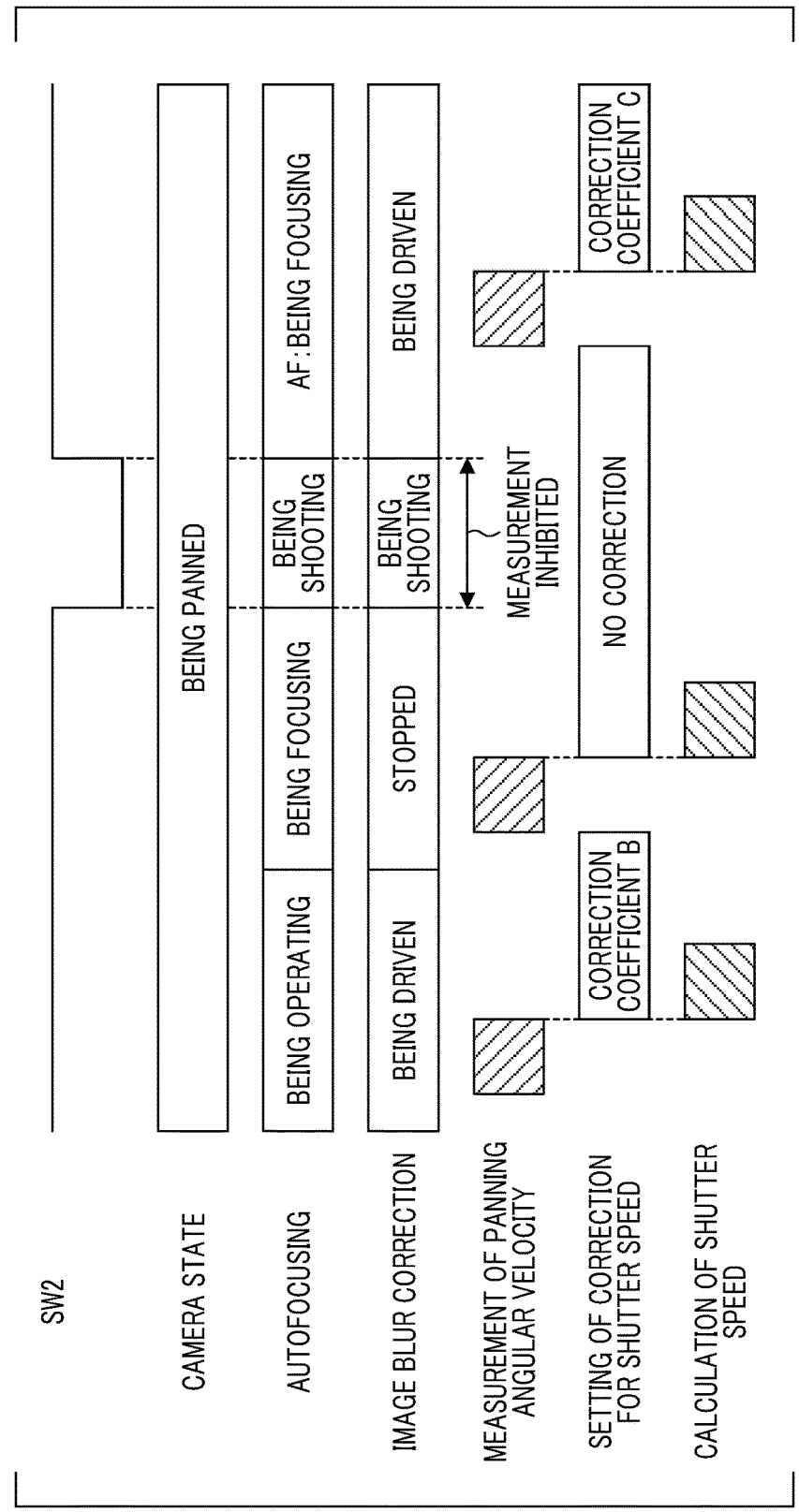

IMAGING APPARATUS AND CONTROL METHOD THEREFOR, AND EXTERNAL DEVICE

BACKGROUND OF THE INVENTION

Field of the Invention

The present invention relates to exposure control by which an influence caused by interferences can be reduced if a shake detection unit in the main body of an imaging apparatus receives the interferences due to the drive of an external device mounted on the main body.

Description of the Related Art

In a typical image shake correction device provided in an imaging apparatus, a shake detection sensor such as an angular velocity sensor is used for the detection of an amount of shaking of the apparatus caused by camera shaking and the like and for the detection of an angular velocity for panning the imaging apparatus. A part or the whole of an imaging optical system is driven based on information about the shaking of the imaging apparatus, which has been detected by the shake detection sensor, so that an image shake on an image formation plane is corrected. Additionally, there is an imaging apparatus having a function of supporting panning, which is a photographing technique rendering a full sense of the speed of an object (hereinafter, referred to as "panning assistance"). A shutter speed for performing photographing of a background with an optimum flow amount is set based on the angular velocity for panning the imaging apparatus, which has been detected by the shake detection sensor.

Additionally, the imaging apparatus has various sources of vibrations, for example, an ultrasonic motor that controls a drive unit such as a mirror and a shutter, or that controls a focus adjustment lens. Most of the vibration sources are driven with a drive frequency unique to a lens device, for which the control from the imaging apparatus is impossible. The sensitivity of the angular velocity sensor is very high. If vibrations occur at a cycle close to a cycle corresponding to the drive frequency of the angular velocity sensor, the angular velocity sensor may receive interferences due to the vibrations caused by the vibration sources. If a user performs a panning operation of the imaging apparatus for the purpose of panning in a state in which the influence of the vibrations is caused, the output of sensors in which an amount of noises that occur due to the interferences is superimposed is acquired. In other words, the angular velocity sensor outputs not only signals corresponding to the angular velocity of the panning operation but also detection signals including noise components due to vibrations. Hence, the speed to be set for a panning may be excessively high if a false detection, in which a panning operation is being performed faster than the panning is actually being performed, is caused. In this case, the flow amount of the background image is smaller than an amount intended by a user. Japanese Patent Application Laid-Open No. 2015-215553 discloses a method of determining whether or not a panning is being performed based on the detected angular velocity, calculating a shutter speed based on an angular velocity and a focal length, and calculating an aperture value based on the focal length and the distance from an object.

In the conventional imaging apparatuses, a case in which the superimposing of noise components caused by the interferences is not considered, in a mode in which the an accessory such as an interchangeable lens or an external strobe is used by being mounted on the main body of the imaging apparatus. Specifically, a difficulty may be caused if the shake detection sensor in the main body of the imaging apparatus receives the interferences due to vibrations and noises caused by a mechanism unit inside the external device, which is driven with a unique drive frequency by which the control from the main body of the imaging apparatus is impossible. In a panning, the flow amount of the background image that has been shot at a calculated shutter speed may not become an amount intended by a user.

SUMMARY OF THE INVENTION

In the present invention, if a drive frequency of an external device mounted on the main body of an imaging apparatus interferes with a drive frequency of a shake detection unit in the main body, exposure control by which an influence of the interferences is reduced is performed.

According to an embodiment of the present invention, an imaging apparatus having a main body on which an external device can be mounted is provided that includes a detection unit configured to detect shake of the main body; and a control unit configured to control an exposure time of an imaging unit based on a detection signal generated by the detection unit and frequency information of the external device mounted on the main body.

According to the imaging apparatus of the present invention, it is possible to perform the exposure control by which the influence caused by the interferences is reduced if the drive frequency of the external device mounted on the main body of the imaging apparatus interferes with the drive frequency of the shake detection unit inside the main body.

Further features of the present invention will become apparent from the following description of exemplary embodiments (with reference to the attached drawings).

BRIEF DESCRIPTION OF THE DRAWINGS

FIGS. 10A and 10B are explanatory diagrams of the correcting calculation for the shutter speed according to a third embodiment.

FIG. 11 illustrates an example of calculation during a panning operation according to the third embodiment.

DESCRIPTION OF THE EMBODIMENTS

Hereinafter, the present invention will be described in detail with reference to the attached drawings according to first to third embodiments. In each embodiment, an interchangeable lens imaging system having a function of supporting panning (panning assistance) will be described. A mode in which the setting of the panning assistance has been performed is referred to as a "panning assistance mode".

First Embodiment

Figure 1:
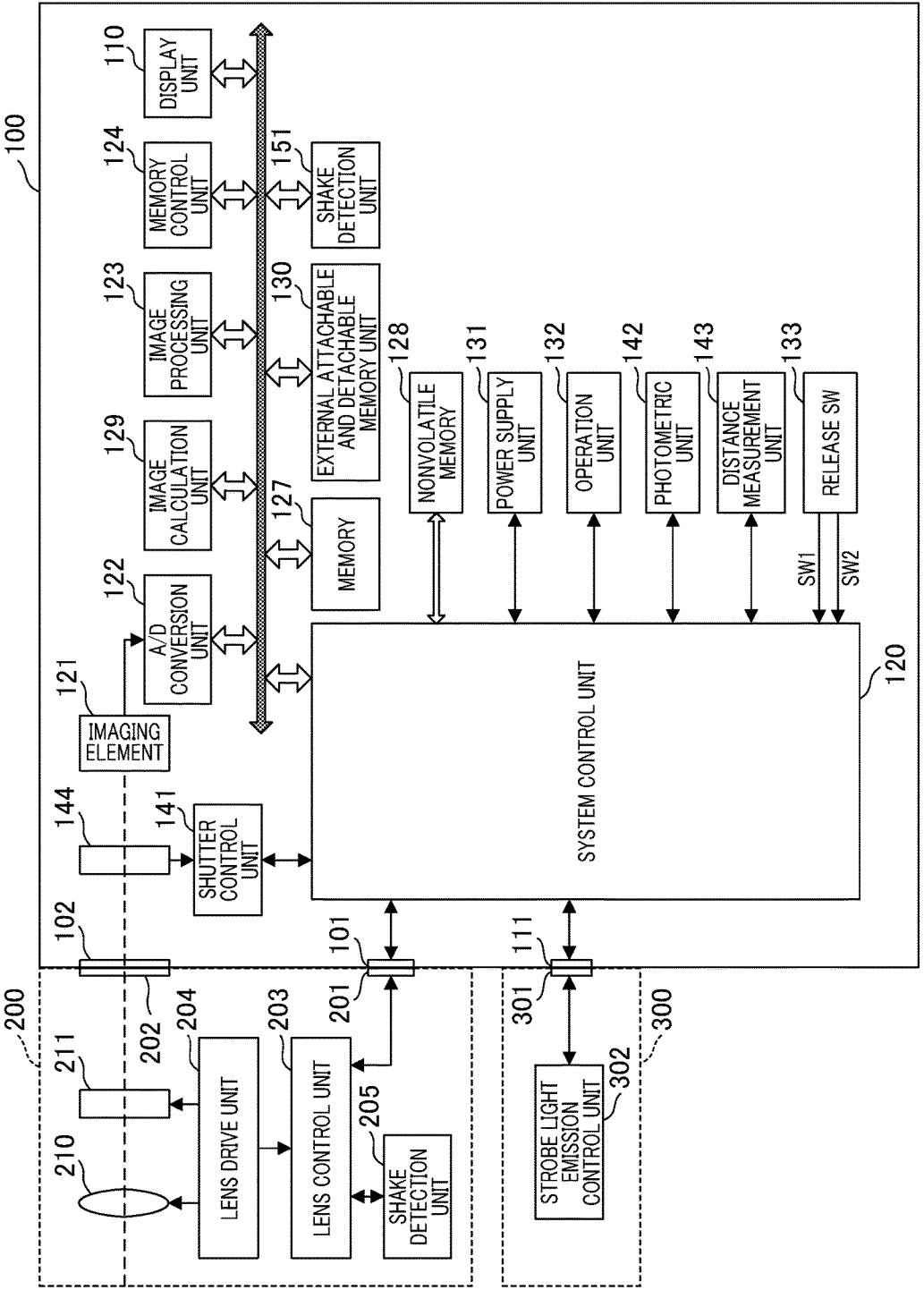
FIG. 1 is a block diagram illustrating a configuration of an imaging apparatus according to a first embodiment of the present invention.

Hereinafter, a first embodiment of the present invention will be described with reference to FIGS. 1 to 5B. In the present embodiment, a description will be given of the calculation of a shutter speed during a panning based on a drive frequency of a lens drive unit. FIG. 1 is a block diagram of an imaging apparatus including a shake detection unit according to the present embodiment. An interchangeable lens imaging system by which a lens device 200 can be mounted on an imaging apparatus main body 100 will be described. A configuration of the main body of the imaging apparatus (hereinafter, simply referred to as the "main body") 100 will be described. An imaging element 121 receives lights from an object formed through an imaging optical system of the lens device 200 and a shutter 144, and photoelectrically converts an optical image of the object into electric signals. An A/D conversion unit 122 converts analog signals output from the imaging element 121 into digital signals. The A/D converted digital signals are stored in a memory 127 by the control of a memory control unit 124 and a system control unit 120. The memory 127 stores data of, for example, still images and moving images that have been shot, and images for reproduction display. The memory 127 has a sufficient storage capacity for storing a predetermined number of the still images and the moving images.

An image processing unit 123 performs, for example, a pixel interpolation process and a color conversion process on the data of the digital signals that has undergone A/D-conversion by the A/D conversion unit 122. The image processing unit 123 includes a compression and decompression circuit that compresses and decompresses image data by using adaptive discrete cosine transformation (ADCT) and the like. The image processing unit 123 enables reading the image data stored in the memory 127, performing a compression process or a decompression process, and writing the processed data on the memory 127. An image calculation unit 129 calculates a contrast value of a captured image and performs measurement of an in-focus state of the captured image based on the contrast value. Resulting from the calculation of a correlation value between the image data stored in the memory 127 and the current captured image data, a process of searching for an image region having the highest correlation is executed.

The memory control unit 124 controls the sending and receiving of data between the A/D conversion unit 122, the image processing unit 123, a display unit 110, an external attachable and detachable memory unit 130, and the memory 127. The data output from the A/D conversion unit 122 is written to the memory 127 via the image processing unit 123 under the control of the memory control unit 124.

The display unit 110 includes, for example, a liquid crystal panel unit and a backlight illumination unit. The display unit 110 displays a through image in real time based on the captured image data acquired by the imaging element 121. Accordingly, it is possible to perform what has been referred to as "live view photographing". During the live view photographing, an AF frame is displayed superimposed on the image by the display unit 110 such that an operator can recognize the position of the object that is a target of AF (auto focus). The AF frame corresponds to a focus detection region for focusing on a desired object. If the display unit 110 has a touch panel, the operator can perform an operation for designating the position of a desired AF frame on the display screen (touch AF).

The system control unit 120 is a central unit that controls the entire imaging system and is communicable with a lens control unit 203 in the lens device 200 via the connection terminal units 101 and 201. The connection terminal unit 101 is located at the main body 100 side, and the connection terminal unit 201 is located at the lens device 200 side. In a state in which the lens device 200 is mounted on the main body 100, the system control unit 120 can control the lens device 200. Additionally, the system control unit 120 can control a strobe unit (light emitter) 300 via hot shoes 111 and 301. In a state in which the strobe unit 300 is mounted on the main body 100, the system control unit 120 communicates with a strobe light emission control unit 302 to control the strobe unit 300. The strobe unit 300 has a function of projecting lights of AF auxiliary lights and a function of controlling an amount of flash light.

The system control unit 120 includes a CPU (Central Processing Unit) and controls each component of the imaging system by executing a control program. The system control unit 120 is connected to each unit (110, 122 to 124, 127, 129, 130, and 151) via a bus. In the memory 127, a program stack region, a status storage region, a calculation region, a work region, and an image display data region of the system control unit 120 are secured. The CPU performs various calculations by using the calculation region of the memory 127. A nonvolatile memory 128 is a storage device in which erasing and recording are electrically possible, for which, for example, a flash memory, an electrically erasable programmable read-only memory (EEPROM), and the like are used. The nonvolatile memory 128 stores data saving a photographing state and a program that controls the imaging apparatus.

The external attachable and detachable memory unit 130 is a memory unit that records data of an image file on a recording medium such as a compact flash (registered trademark) and an SD card and reads out the data. The user can attach and detach the recording medium to and from the main body 100. A power supply unit 131 includes, for example, a battery, a battery detection circuit, a DC-DC converter, a switch circuit that switches a target for energization, and detects the presence or absence of the placement of a battery, the type of the battery, and the remaining battery level. The power supply unit 131 controls the DC-DC converter based on the detected result and the command from the system control unit 120 to supply a power to each unit.

An operation unit 132 includes an operation member for inputting various operation commands to the system control unit 120. The operation unit 132 is configured by one or a combination of, for example, a switch, a dial, a pointing device by visual line detection, and a voice recognition device. A release switch 133 is an operation switch that generates a first signal (referred to as "SW1") by a half-pressing operation of the release button and generates a second signal (referred to as "SW2") by a complete-pressing operation thereof. For example, an AF (automatic focus adjustment) process, an AE (automatic exposure) process, and an EF (flash light amount control) process are started due to an SW1 signal during the half-pressing operation. Due to an SW2 signal during the complete-pressing, an imaging process that reads out signals from the imaging element 121 and writes the image data on the memory 127 via the A/D conversion unit 122 and the memory control unit 124, and a development process using the calculation by the image processing unit 123 and the memory control unit 124 are performed. Further, a series of processes, that is, a recording process including reading out the image data from the memory 127, compressing the data by the image processing unit 123, and writing the image data on the recording medium inserted into the externally attachable and detachable memory unit 130, is executed.

A shutter control unit 141 controls the shutter 144 in accordance with the control signals from the system control unit 120, thereby controlling an exposure time of the imaging element 121. The shutter 144 guides light rays to the imaging element 121 during photographing while shielding lights of the imaging element 121 during non-photographing. The shutter control is performed in cooperation with the lens control unit 203 that controls a aperture 211 of the lens device 200 based on the photometric information from a photometric unit 142. If the light rays enter through the imaging optical system, the photometric unit 142 for performing the AE process performs a photometric process with the lights received via a photometric lens and outputs the measurement result to the system control unit 120. It is possible to measure an exposure state of the image formed as an optical image. Additionally, the photometric unit 142 has an EF processing function in cooperation with the strobe unit 300.

A distance measurement unit 143 performs the AF process and outputs the detected result of the focal state to the system control unit 120. If the light rays enter through the imaging optical system, the distance measurement unit 143 receives the lights via a distance measuring mirror and can measure the in-focus state of the image formed as an optical image. Note that during live view photographing, it is also possible to measure the in-focus state of the captured image in accordance with the contrast value that has been calculated from the image data output from the image calculation unit 129 (contrast AF method).

Figure 2:
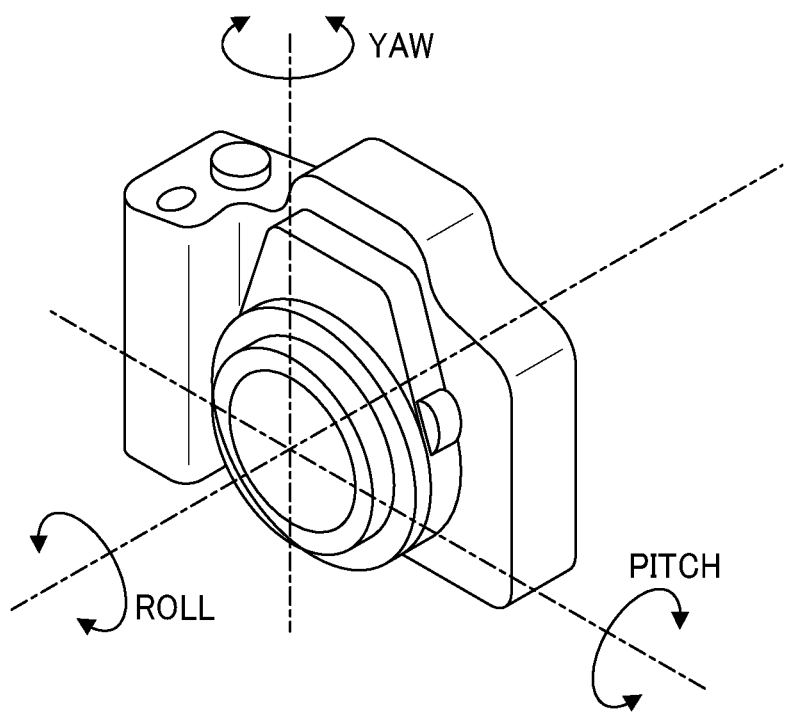
FIG. 2 is a schematic diagram illustrating a detection direction of shaking of the imaging apparatus.

A shake detection unit 151 includes, for example, an angular velocity sensor and detects a vibration amount of the main body 100. FIG. 2 is a schematic diagram illustrating vibration directions detectable by the shake detection unit 151. The shake detection unit 151 detects vibrations in three axis directions, that is, the pitch direction, yaw direction, and roll direction. The pitch direction is a rotation direction around the first axis out of the two axes orthogonal to the optical axis of the imaging optical system. The yaw direction is a rotation direction around the second axis. The roll direction is the rotation direction around the optical axis of the imaging optical system. For example, in response to the vibrations in each direction, an angular velocity of the panning operation of the imaging apparatus during a panning is detected.

The main body 100 includes a lens mount 102 serving as a holding mechanism unit for connecting with the lens device 200. The lens device 200 can be mounted on the main body 100 by coupling the lens mount 202 with the lens mount 102. Additionally, the main body 100 includes the connection terminal unit 101 for electrically connecting with the lens device 200, and is connected with the connection terminal unit 201 of the lens device 200. The system control unit 120 is communicable with the lens control unit 203 via the connection terminal units 101 and 201.

The lens device 200 is an interchangeable lens unit and includes a lens 210 and the aperture 211. The lens 210 is configured by a plurality of lens groups and has a zoom lens, a focus lens, an image shake correcting lens that corrects an image shake caused, for example, by camera shake. Light from an object passes through the lens 210, the aperture 211, the lens mounts 202 and 102, and the shutter 144, and forms an image on the imaging element 121. Additionally, the photometric unit 142 and the distance measurement unit 143 detect an object light that has passed through the lens 210, the aperture 211, and the lens mounts 202 and 102.

The lens control unit 203 controls the entire lens device 200. The lens control unit 203 includes a memory that stores constants, variables, programs, and the like for operation. Additionally, the lens control unit 203 includes a nonvolatile memory that holds, for example, identification information such as a number unique to the lens device 200, management information, function information such as an open aperture value and a minimum aperture value, and a focal length, current and past setting values, and drive frequency information of a lens drive unit 204. The drive frequency information is transmitted to the system control unit 120. The lens control unit 203 controls the focus adjustment of the lens 210 depending on the information about the in-focus state of the image that has been measured by the distance measurement unit 143 or the image processing unit 123. The AF operation is performed by changing the image formation position of the object light incident on the imaging element 121. Additionally, the lens control unit 203 controls the aperture 211 and the zooming of the lens 210.

The lens drive unit 204 drives the lens 210 and the aperture 211 in response to the control signals from the lens control unit 203. The lens drive unit 204 includes a focus adjustment mechanism unit, a zooming mechanism unit, an image shake correction mechanism unit, and a aperture mechanism unit. The lens drive unit 204 drives the focus lens based on the control signals for focus adjustment from the lens control unit 203 and drives the zoom lens in response to the zooming control signals. Additionally, the lens drive unit 204 drives the image shake correction lens based on the control signals for image shake correction from the lens control unit 203. Further, the lens drive unit 204 drives the aperture 211 based on the aperture control signals from the lens control unit 203.

A shake detection unit 205 includes a gyro sensor and the like and detects an amount of vibrations of the lens device 200. The shake detection unit 205 detects, for example, shaking in two axis directions, the pitch direction and the yaw direction, from among the pitch direction, the yaw direction, and the roll direction shown in FIG. 2, and outputs the detected signals to the lens control unit 203. The lens control unit 203 drives and controls the image shake correction lens in accordance with the detected shaking and performs optical image shake correction. Alternatively, the system control unit 120 controls the electronic image shake correction by using an image process based on the captured image acquired by the imaging element 121. For the optical image shake correction, a correction process by using a control of the movement of the imaging element 121 may be used, or both optical image shake correction and electronic image shake correction may be used together.

The external strobe is an example of an accessory that can be mounted on the main body 100. The hot shoe 111 of the main body 100 is an interface unit connected to the accessory shoe 301 of the strobe unit 300. The strobe light emission control unit 302 that controls the entire strobe unit 300 controls an amount of light emission and a timing of light emission based on the information from the photometric unit 142 for a light emitting unit such as a xenon tube (not illustrated). Additionally, the strobe light emission control unit 302 includes a nonvolatile memory that holds the drive frequency information and the like, such as drive frequency information of the strobe charging circuit.

Figure 3:
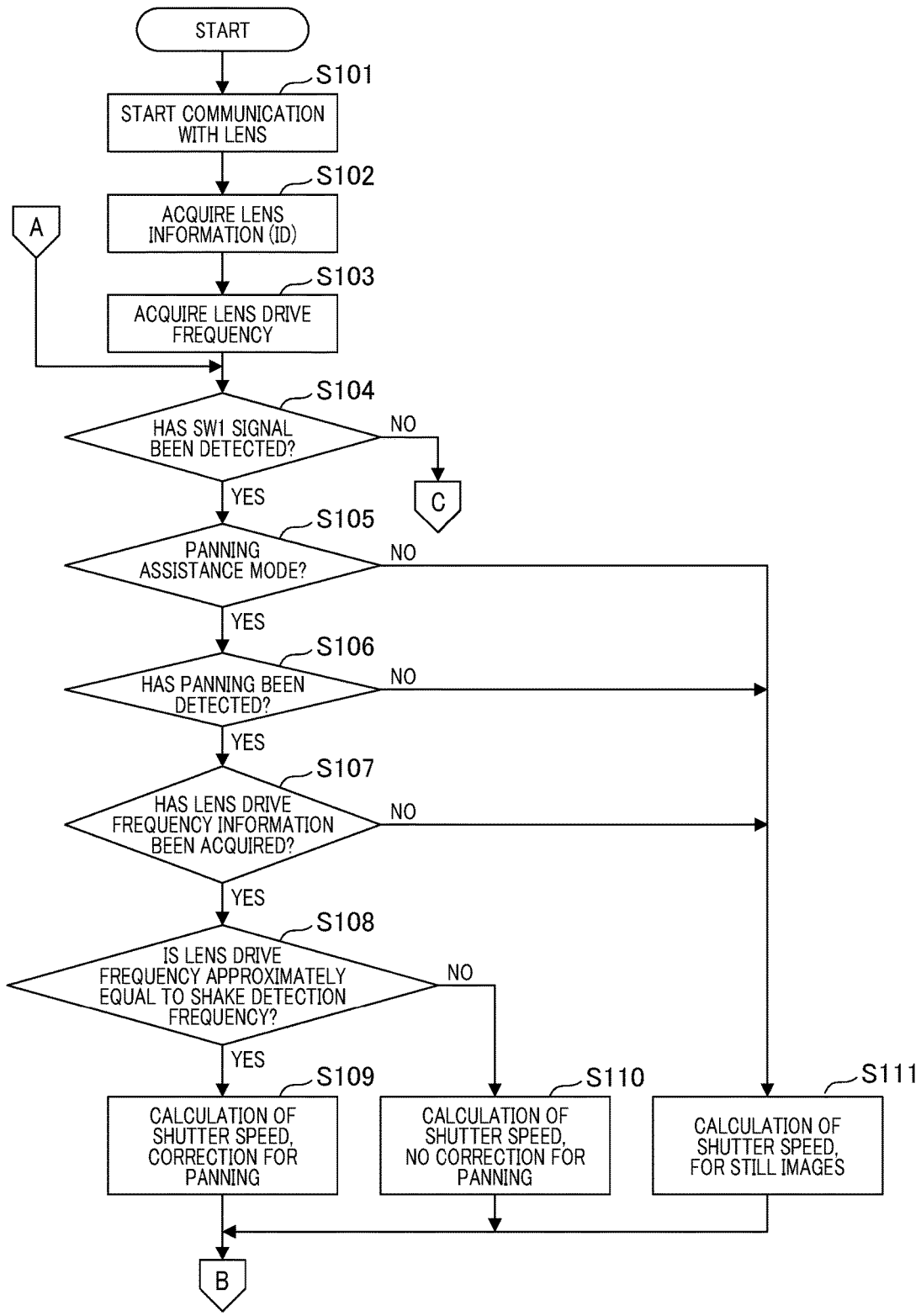
FIG. 3 is a flowchart illustrating a process of setting a shutter speed according to the first embodiment.
Figure 4:
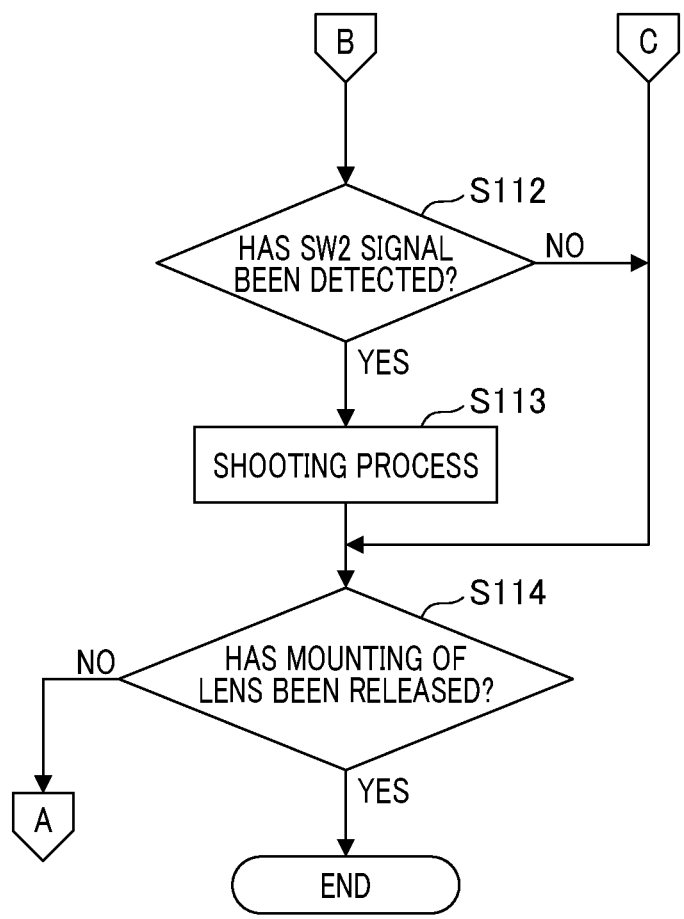
FIG. 4 is a flowchart illustrating a process following FIG. 3.

A main process in the present embodiment will be described with reference to FIGS. 3 and 4. FIGS. 3 and 4 are flow charts that mainly explain a process of calculating a shutter speed. The process starts when the lens device 200 is mounted on the main body 100 via the lens mounts 202 and 102 and the user performs an operation for starting the imaging apparatus by using the operation unit 132.

In step S101, communication between the system control unit 120 and the lens control unit 203 starts. In step S102, the system control unit 120 acquires lens information from the lens control unit 203. The lens information includes information for identifying the lens device 200 mounted on the main body 100. For example, the information includes identification information such as a lens ID and information about an optical correction value unique to the lens device 200.

In step S103, the system control unit 120 acquires information about a lens drive frequency from the lens control unit 203. This information is about the drive frequency of the lens drive unit 204 in the lens device 200 mounted on the main body 100. The drive frequency information includes information such as a drive frequency of the focusing (focus adjustment) mechanism unit and a drive frequency of the image shake correction mechanism unit. In step S103, if acquiring the drive frequency information by communication is impossible, specifying the drive frequency information based on the lens information acquired in step S102 is possible. In this case, the system control unit 120 specifies the drive frequency information stored in advance in the nonvolatile memory 128 based on the lens information.

In step S104, the system control unit 120 determines whether or not the SW1 signal due to the half-pressing operation of the release switch 133 has been detected. If the SW1 signal has been detected, the process proceeds to step S105. If not, the process proceeds to step S114 in FIG. 4.

In step S105, the system control unit 120 determines whether or not the panning assistance mode is set as the photographing mode. In the panning assistance mode, the system control unit 120 automatically sets a shutter speed so as to enable photographing in which the background image flows at a constant amount in accordance with the angular velocity of the panning operation of the imaging apparatus. If the system control unit 120 determines that the panning assistance mode is set as the photographing mode, the process proceeds to step S106. If the system control unit 120 determines that the panning assistance mode is not set as the photographing mode, the process proceeds to step S111.

In step S106, the system control unit 120 performs a panning determination process. The system control unit 120 acquires output data of the shake detection unit 151 and determines whether or not panning of the imaging apparatus is being performed. If the system control unit 120 determines that panning of the imaging apparatus is being performed, the process proceeds to step S107. If the system control unit 120 determines that panning of the imaging apparatus is not being performed, the process proceeds to step S111.

In step S107, the system control unit 120 determines whether or not the drive frequency information in step S103 has been acquired. Specifically, the system control unit 120 determines whether or not the lens device 200 mounted on the main body 100 is a lens device that can acquire the drive frequency information of the lens drive unit 204. If the system control unit 120 determines that the lens device 200 is the lens device that can acquire the drive frequency information, the process proceeds to step S108. If not, the process proceeds to step S111.

In S108, the system control unit 120 compares the drive frequency information of the lens drive unit 204 acquired in S103 with the frequency of the shake detection signals from the shake detection unit 151 inside the imaging apparatus. A process that determines whether or not the shake detection unit 151 receives interferences due to vibrations propagating from the lens device 200 to the main body 100 is performed. If a difference between the drive frequency of the lens drive unit 204 and the frequency of the shake detection signals is within the range of predetermined threshold values, it is determined that the shake detection unit 151 is receiving interferences due to the vibrations, and the process proceeds to step S109. If it is determined that the shake detection unit 151 is not receiving interferences due to the vibrations, the process proceeds to step S110.

In step S109, the system control unit 120 calculates a shutter speed to be set in the panning assistance mode. Specifically, a process of correcting the angular velocity of the panning operation of the imaging apparatus detected by the shake detection unit 151, in which the amount of receiving interferences due to the drive of the lens drive unit 204 is assumed, is performed. The shutter speed for panning is determined by using the calculation obtained by adding a correction amount. A specific example will be described below with reference to FIGS. 5A and 5B. In contrast, in S110, the system control unit 120 does not perform the correction process. That is, the shutter speed to be set in the panning assistance mode is determined by the calculation in accordance with the angular velocity of the panning operation of the imaging apparatus detected by the shake detection unit 151. Additionally, in step S111, the system control unit 120 calculates a shutter speed to be set when a still image photographing in response to a photometric value of the photometric unit 142 or an AE photometric value of the imaging element 121 is performed. As a result, the shutter speed for still image photographing is determined.

Following steps S109, S110, or S111, the process proceeds to step S112 in FIG. 4, and then the system control unit 120 determines whether or not the SW 2 signal has been detected by the complete-pressing operation of the release switch 133. If the SW2 signal has been detected, the process proceeds to step S113, and if the SW2 signal has not been detected, the process proceeds to step S114.

In step S113, the system control unit 120 executes a photographing process. The signals read out from the imaging element 121 are written to the memory 127 via the A/D conversion unit 122 and the memory control unit 124, and a development process is performed by the calculation by the image processing unit 123 and the memory control unit 124. Additionally, the image processing unit 123 performs a compression process on the image data read out from the memory 127, and a series of processes that record the image data on the recording medium is executed in the external attachable and detachable memory unit 130.

In step S114, the system control unit 120 determines whether or not the lens device 200 mounted on the main body 100 has been removed. If the system control unit 120 determines that the lens device 200 mounted on the main body 100 has been removed, the process ends. If the system control unit 120 determines that the lens device 200 is mounted on the main body 100, the process returns to step S104 in FIG. 3 to continue the process.

Figure 5A:
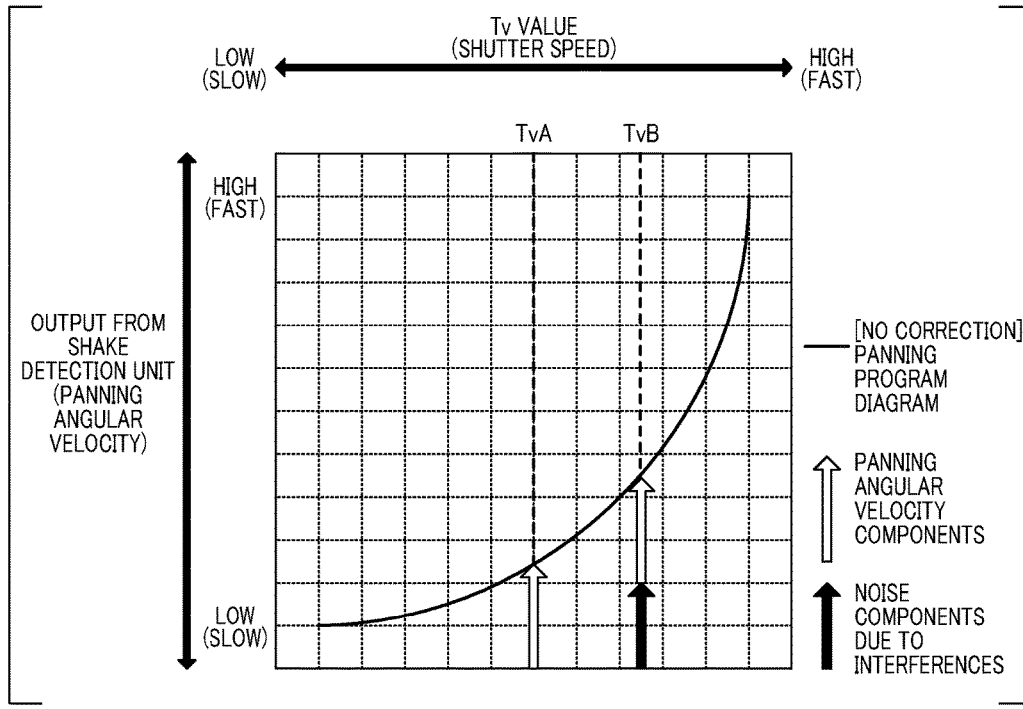
FIGS. 5A and 5B are explanatory diagrams of a correcting calculation for the shutter speed according to the first embodiment.
Figure 5B:
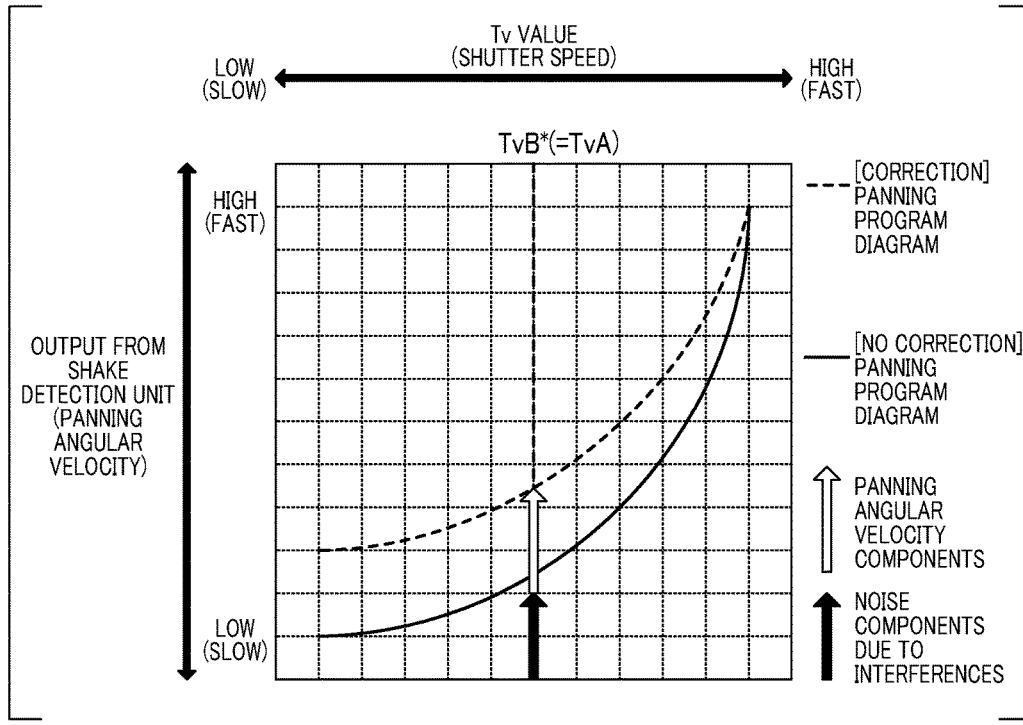

FIGS. 5A and 5B illustrate the process in step S109 in FIG. 3, in which the correcting calculation for the shutter speed during panning will be exemplified. FIGS. 5A and 5B illustrate an example of the panning angular velocity calculated from the shake detection signals, in which the same example is also applied to the case of the tilting angular velocity, except for the difference in the detection direction. In both FIGS. 5A and 5B, the vertical axis represents the output of the shake detection unit 151, and the horizontal axis represents the shutter speed (Tv value). The system control unit 120 calculates the panning angular velocity based on the output of the shake detection unit 151. The Tv value indicates a shutter speed calculated so as to have an any flow amount based on the panning angular velocity that has been calculated by the system control unit 120. In the example of the calculation for the shutter speed shown in FIGS. 5A and 5B, the relation of the shutter speed to the panning angular velocity is shown by a solid line. In a graph curve, black outline arrows show panning angular velocity components, and a solid black arrow shows noise components due to the interferences.

FIG. 5A illustrates the result for calculating the shutter speed TvB when the interferences occur and the shutter speed TvA when the interferences do not occur. "When interferences occur" refers to a case in which vibrations occur if an external device such as a lens device and the like that is mounted on the main body affects the main body of the imaging apparatus. "When interferences do not occur" refers to a case in which vibrations occur if an external device such as a lens device and the like that is mounted on the main body does not affect the main body of the imaging apparatus, or a case in which the influence of the vibrations is encompassed within an allowable range.

The shutter speed to be set is TvA when a lens device not interfering with the shake detection unit 151 is used, even if a movable lens and the like are driven by the lens drive unit 204 of the lens device 200 mounted on the main body 100. Specifically, based on the output of the shake detection unit 151, the panning angular velocity of the imaging apparatus calculated by the system control unit 120 is obtained by only a component due to panning shown by a black outline circle.

In contrast, the shutter speed to be set if the lens device that interferes with the shake detection unit 151 is mounted on the main body 100 is TvB, which is larger than TvA. In this case, based on the output of the shake detection unit 151, the panning angular velocity of the imaging apparatus calculated by the system control unit 120 attains an angular velocity obtained by superimposing the angular velocity component by panning shown by a black outline arrow and noise components generated due to the interferences shown by a solid black arrow. Therefore, even with a constant panning angular velocity of the imaging apparatus, if the lens device that causes the interferences is mounted on the main body, the system control unit 120 erroneously recognizes that panning that is faster than a case in which the lens device that is being performed does not cause interferences is mounted on the main body. As a result, since TvB that is faster than TvA is calculated as a shutter speed, the background image that has been shot may not flow faster than the image that is intended by the user.

FIG. 5B illustrates the correcting calculation for the shutter speed when interferences occur in the present embodiment. A dotted line shows a graph curve if the correcting calculation for the shutter speed is performed. In comparison, a solid line shows a graph curve if the correcting calculation for the shutter speed is not performed.

The correction is performed for achieving the effect of the panning so as to close the shutter speed to TvA shown in FIG. 5A when photographing is performed with the panning angular velocity remaining unchanged even if the noise component that is generated due to interferences shown by the black arrow affects the shake detection unit 15. In the graph curve shown by a solid line, the Tv value is set to be large when interferences affected by the noise component occur. Hence, the system control unit 120 changes the control to calculate the shutter speed using the graph curve shown by the dotted line. The graph curve shown by a dotted line is a curve obtained by shifting the graph curve shown by a solid line to the upper side along the vertical axis and reducing the gradient by changing a coefficient of the calculation when interferences occur. Accordingly, the shutter speed calculated by correction when interferences occur is TvB*. The value of TvB* is TvA or a value close to the shutter speed TvA when interferences do not occur, which is shown in FIG. 5A. Therefore, it is possible to perform a panning with the flow amount of the background image intended by a user.

In order to perform a panning with any flow amount, in the panning assistance mode, the shutter speed needs to be set faster in accordance with the increase of the panning angular velocity of the imaging apparatus. In contrast, the shutter speed needs to be set slower in accordance with the decrease of the panning angular velocity. In this case, the smaller the panning angular velocity is, the more susceptible it is to the influence of the noise components due to interferences. Accordingly, as shown in FIG. 5B, the system control unit 120 uses a program diagram in which a correction amount of the shutter speed is relatively reduced as the panning angular velocity is high. The correction amount of the shutter speed corresponds to the difference between the graph curves shown by the dotted line and the solid line in FIG. 5B. Additionally, if the panning angular velocity is small, the system control unit 120 uses a program diagram in which the noise component due to interferences is shifted in the vertical axis direction of a shutter speed correction amount as an offset amount. That is, if the panning angular velocity is large, the correction amount is relatively small, and if the panning angular velocity is small, the correction amount is relatively large. For example, the correction amount is inversely proportional to the panning angular velocity. The correction amount can be determined by only changing a coefficient value to be used for the correcting calculation.

In the present embodiment, the system control unit 120 acquires a drive frequency of the lens drive unit 204 from the lens device 200 and determines whether or not the interferences with the shake detection unit 151 in the main body of the imaging apparatus occur. If the system control unit 120 determines that interferences occur, the exposure time for panning is corrected so that photographing with a flow amount of the background image intended by the user is possible independently from the lens device mounted on the main body.

Second Embodiment

Next, a second embodiment of the present invention will be described with reference to FIGS. 6 and 7. In the present embodiment, the same reference numerals are provided for parts and processes that are the same as those in the first embodiment, and the detailed description thereof will be omitted. Such omission of the description will also be applied to embodiments to be described below.

Figure 6:
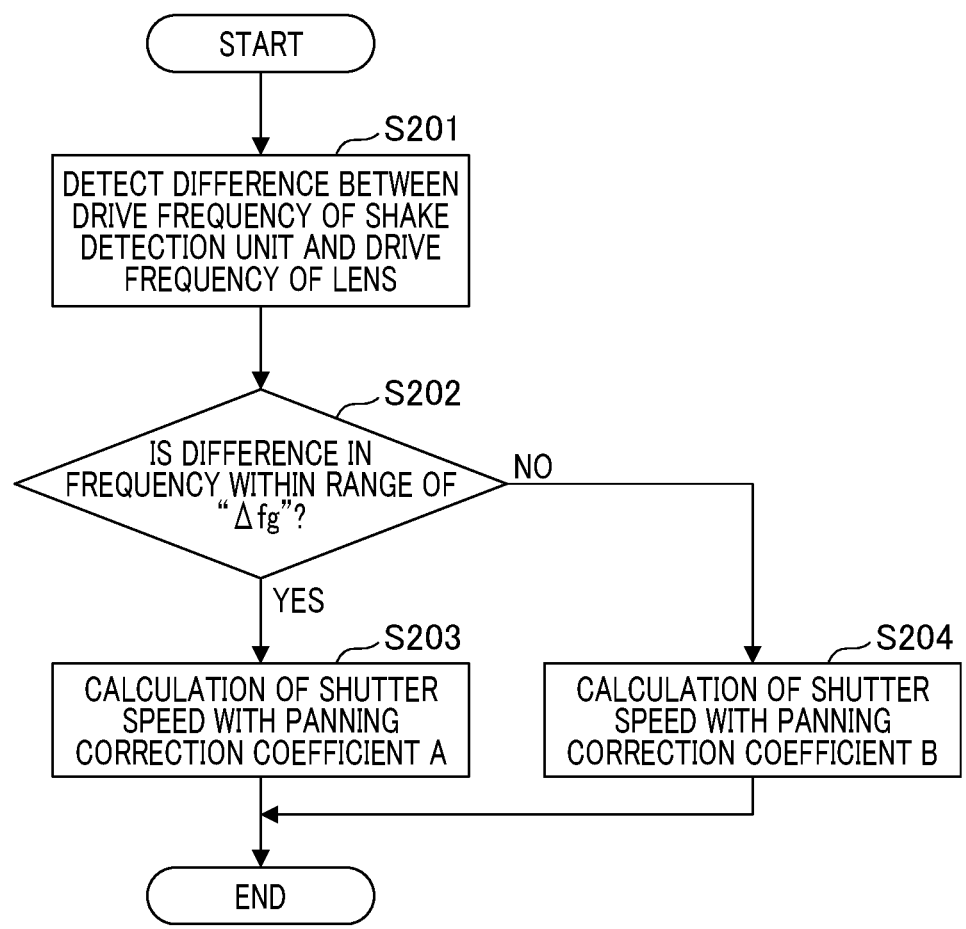
FIG. 6 is a flowchart illustrating a process of setting a shutter speed according to the second embodiment.

FIG. 6 is a flowchart that illustrates a process of calculating the correction of the shutter speed for a panning in step S109 in FIG. 3. The following process starts after obtaining the result of "YES" in step S108, specifically, the process starts after the correction of the shutter speed during the panning is determined as the result of the determination that interferences with the shake detection frequency due to the drive frequency of the lens drive unit 204 occur.

In step S201, the system control unit 120 detects a difference (referred to as "Δf") between the drive frequency information of the image shake correction mechanism unit in the lens drive unit 204 and the drive frequency of the shake detection unit 151 in the imaging apparatus, acquired in step S103 in FIG. 3. In the next step S202, the system control unit 120 compares the difference frequency Δf that has been detected in step S201 with a predetermined threshold value (referred to as "Δfg") and determines whether or not Δf is within the range of the threshold value Δfg. If the system control unit 120 determines that Δf is within the range of the threshold value Δfg, the process proceeds to step S203. If the system control unit 120 determines that Δf is not within the range of the threshold value Δfg, the process proceeds to step S204.

In step S203, the system control unit 120 calculates a shutter speed to be set in the panning assistance mode. At this time, the calculation process is performed by using a first correction coefficient (referred to as "A") for the panning angular velocity detected by the shake detection unit 151. Additionally, in step S204, the system control unit 120 calculates the shutter speed to be set in the panning assistance mode by using a second correction coefficient (referred to as "B") for the panning angular velocity that has been detected by the shake detection unit 151. After steps S203 or S204, the process ends. With reference to FIG. 7, a process of calculating a shutter speed during the panning assistance will be described.

Figure 7:
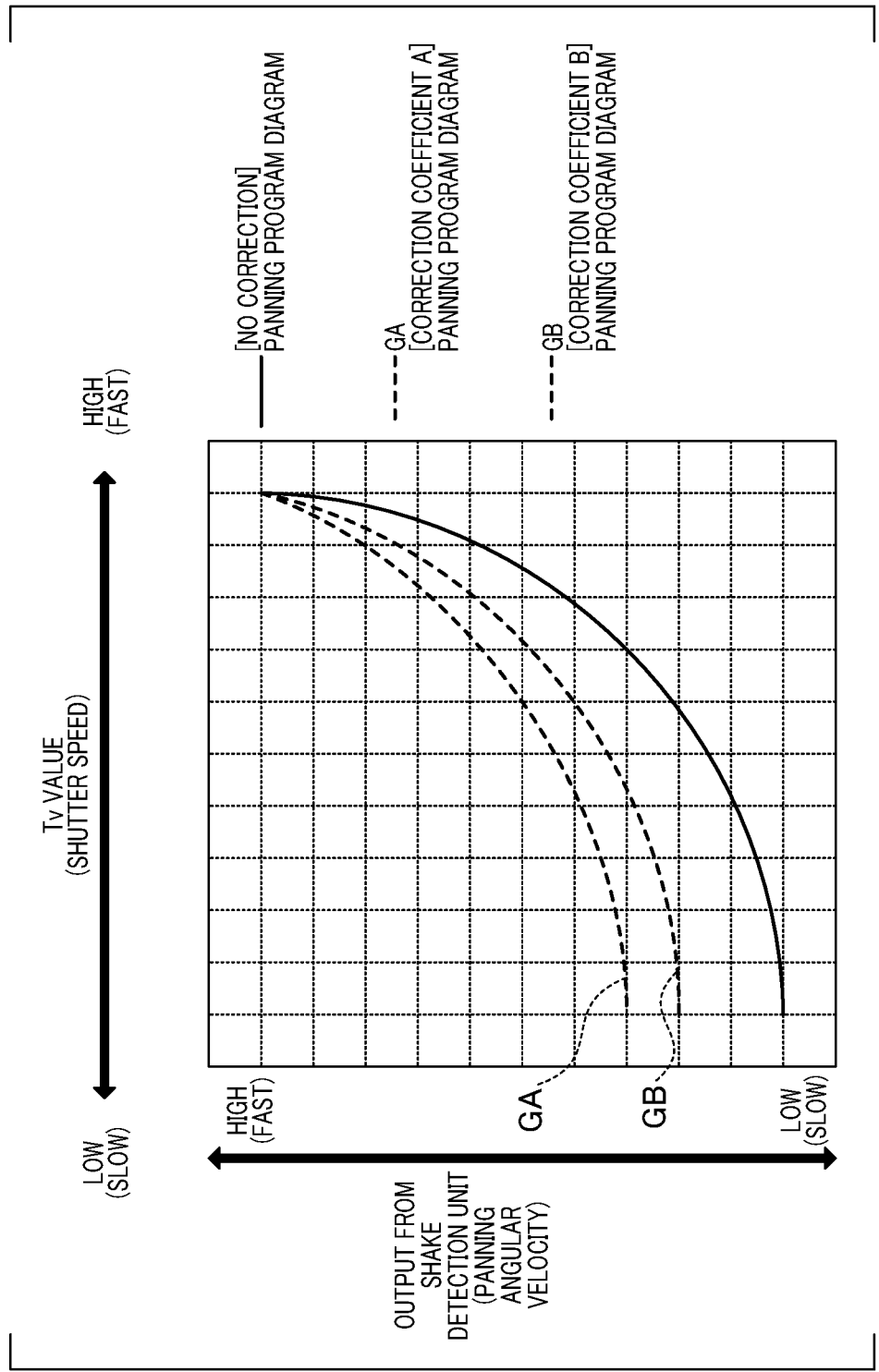
FIG. 7 is an explanatory diagram of the correcting calculation for the shutter speed according to the second embodiment.

FIG. 7 illustrates the correcting calculation for the shutter speed in the present embodiment. The setting of the vertical axis and the horizontal axis is the same as that in FIGS. 5A and 5B, in which the relation between the output of the shake detection unit 151 and the shutter speed is indicated. The graph line shown by a solid line indicates the relation between the shake detection signals and the Tv value when interferences do not occur. Two program diagrams shown by a dotted line indicate the relation between the shake detection signal and Tv value when interferences occur. A graph curve GA corresponds to a program diagram in a case where the correction coefficient A is used for the calculation in step S203 in FIG. 6. A graph curve GB corresponds to a program diagram in a case where the correction coefficient B is used for the calculation in step S204 in FIG. 6.

If the difference frequency Δf is within the range of the threshold value Δfg, the shutter speed is calculated in accordance with the program diagram shown by the graph curve GA with the correction coefficient A. This corresponds to a case in which the influence of the interferences is large because the difference frequency Δf is small. That is, it is assumed that the shake detection unit 151 is greatly influenced by the interferences due to the driving of the lens drive unit 204.

In contrast, if the difference frequency Δf is out of the range of the threshold value Δfg, the shutter speed is calculated in accordance with the program diagram shown by the graph curve GB with the correction coefficient B. The correction coefficient B is smaller than the correction coefficient A. This corresponds to a case in which the influence of interferences is smaller than the case of the graph curve GA with the correction coefficient A. Specifically, although the shake detection unit 151 is influenced by the interferences due to the driving of the lens drive unit 204, the degree of the influence is relatively smaller than the case of the graph curve GA.

In the present embodiment, the system control unit 120 acquires the drive frequency of the lens drive unit 204, detects the difference with the drive frequency of the shake detecting unit 151 in the imaging apparatus, and corrects the exposure time during panning in accordance with the degree of the interferences (difference). Accordingly, photographing is possible with a flow amount of the background image intended by the user, independently from the lens device mounted on the main body. Note that, in the present embodiment, although the correcting calculation for the shutter speed in two stages has been described as an example, any number of stages of the calculation for the correction and any correction amount may be used. This also applies to the third embodiment.

Third Embodiment

Figure 8:
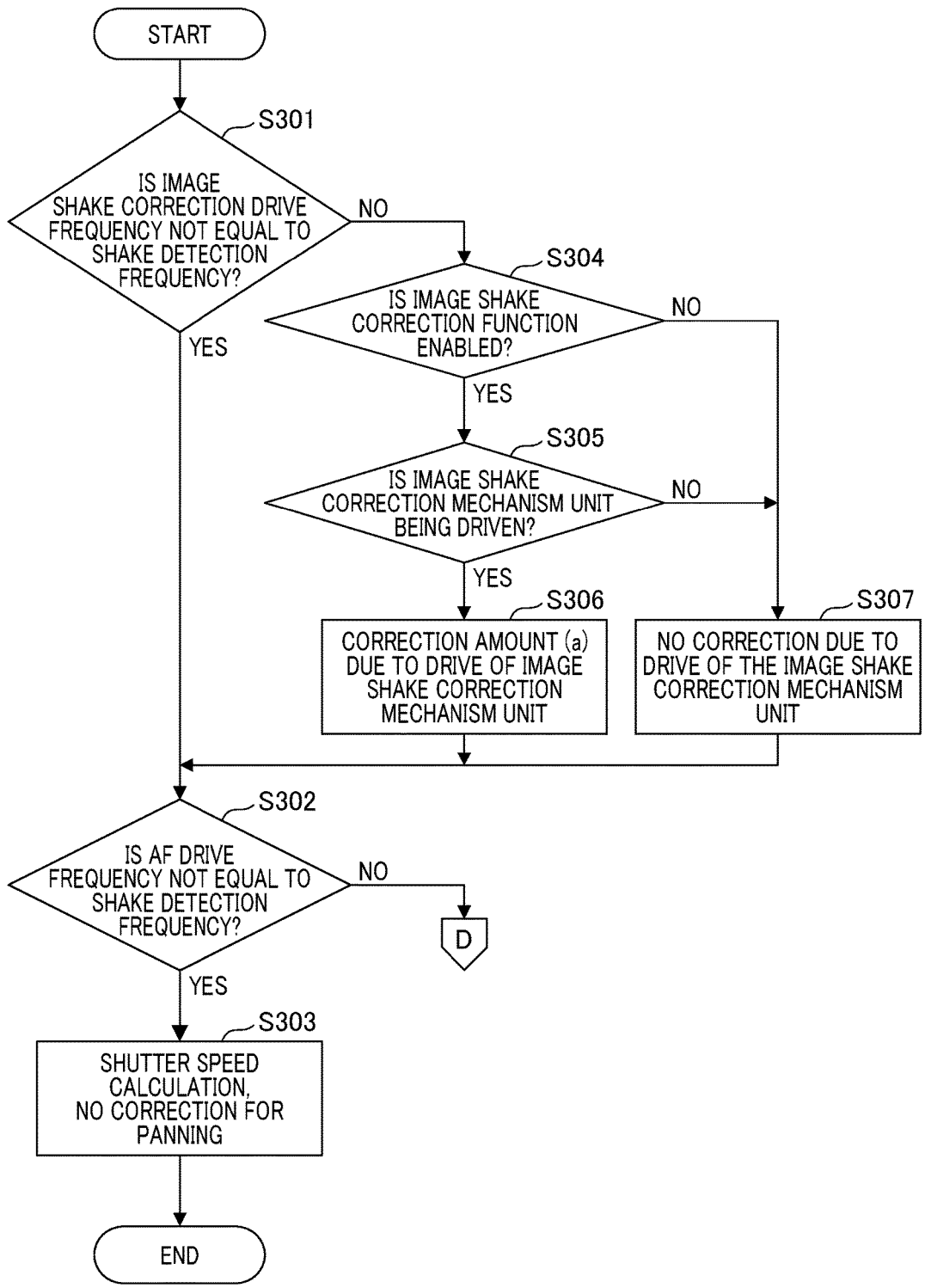
FIG. 8 is a flowchart illustrating a process of setting a shutter speed according to the third embodiment
Figure 9:
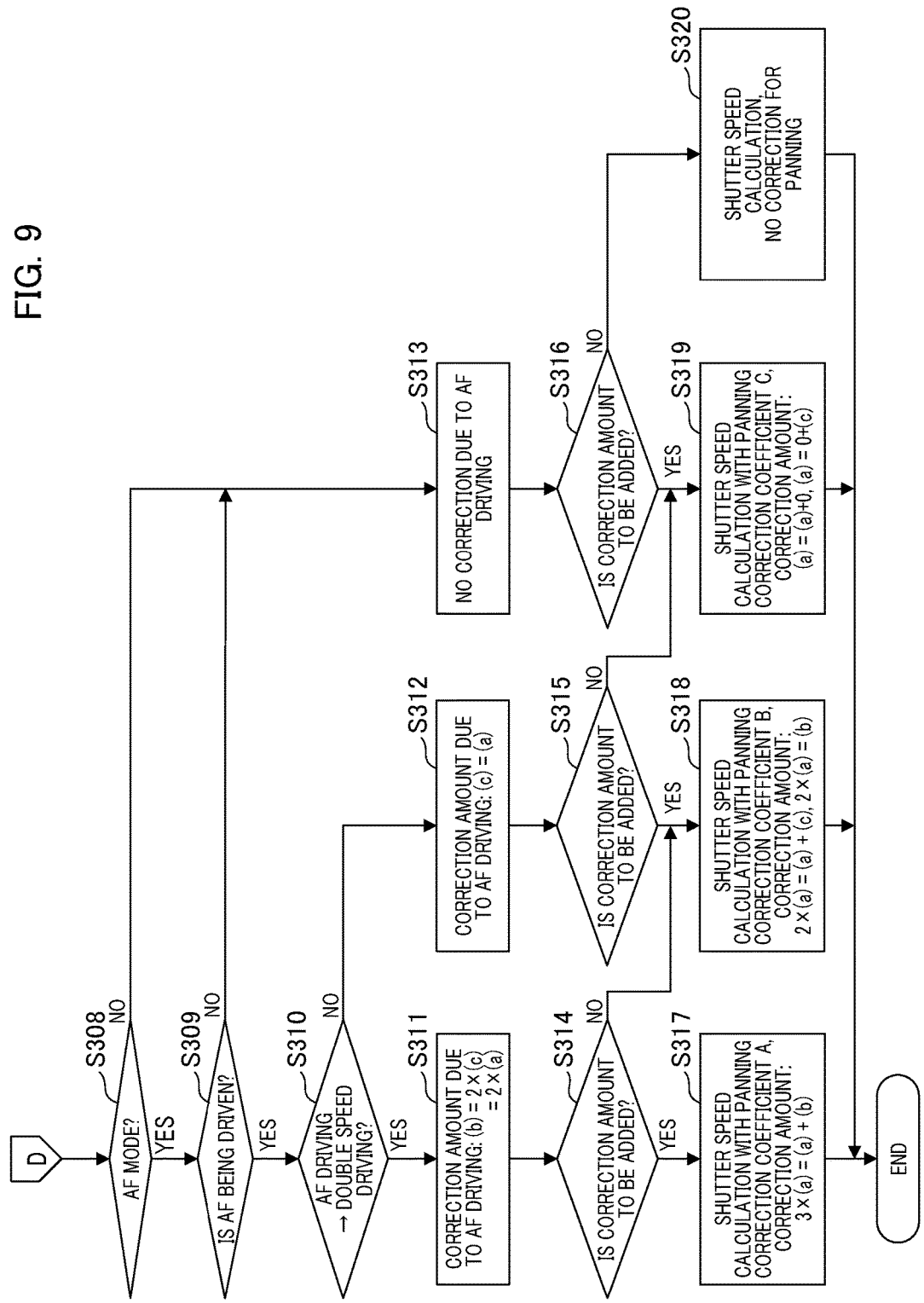
FIG. 9 is a flowchart illustrating a process following FIG. 8.

Next, a third embodiment of the present invention will be described with reference to FIGS. 8 to 11. FIGS. 8 and 9 are flowcharts that illustrate a process of calculating the correction of a shutter speed during the panning assistance in step S109 in FIG. 3. In step S301, the system control unit 120 compares the drive frequency information of the image shake correction mechanism unit driven by the lens drive unit 204 and the detected frequency of the shake detection unit 151 in the main body. The system control unit 120 determines whether or not the shake detection unit 151 receives the interferences caused by the vibrations of the lens device 200 when image shake is corrected. The drive frequency information of the image shake mechanism unit is included in the information about the lens drive frequency acquired in step S103 in FIG. 3. If the drive frequency of the image shake mechanism unit is not equal to the detected frequency detected by the shake detection unit 151 or the difference in frequency is more than the predetermined threshold value, the system control unit 120 determines that interferences do not occur, and the process proceeds to step S302. Additionally, if the drive frequency of the image shake correction mechanism unit is equal to the detected frequency detected by the shake detection unit 151 or the difference in frequency is equal to or less than the threshold value, the system control unit 120 determines that interferences occur, and the process proceeds to step S304.

In step S302, the system control unit 120 compares the drive frequency information of the focus adjustment mechanism unit driven by the lens drive unit 204 and the detected frequency by the shake detection unit 151 in the main body, and determines whether or not the shake detection unit 151 receives the interferences caused by the vibrations during the AF driving. The drive frequency information of the focus adjustment mechanism unit is included in the information about the lens drive frequency acquired in step S103 in FIG. 3. If the drive frequency of the focus adjustment mechanism is not equal to the detected frequency by the shake detection unit 151 or the difference in frequency is equal to or more than the threshold value, the system control unit 120 determines that interferences do not occur, and the process proceeds to step S303. If the drive frequency of the focus adjustment mechanism unit is equal to the detected frequency by the shake detection unit 151 or the difference in frequency is less than the threshold value, the system control unit 120 determines that interferences occur, and the process proceeds to step S308 in FIG. 9.

In step S303, the system control unit 120 calculates a shutter speed to be set in the panning assistance mode. At that time, the system control unit 120 performs a calculation in accordance with the panning angular velocity of the imaging apparatus detected by the shake detection unit 151, instead of performing the correcting calculation for the shutter speed. After step S303, the process ends.

In step S304, the system control unit 120 determines whether or not the image shake correcting function of the lens device 200 mounted on the main body 100 is enabled. Based on the information acquired from the lens control unit 203, if the system control unit 120 determines that the image shake correcting function of the lens device 200 is enabled, the process proceeds to step S305, and if the system control unit 120 determines that the image shake correcting function is not enabled, the process proceeds to step S307.

In step S305, the system control unit 120 determines whether or not the image shake correction mechanism unit of the lens device 200 is being driven based on the information acquired from the lens control unit 203. If the system control unit 120 determines that the image shake correction is being performed by the drive of the image shake correction mechanism unit, the process proceeds to step S306. If the system control unit 120 determines that the image shake correction is not being performed, the process proceeds to step S307.

In step S306, the system control unit 120 determines the correction amount for the shutter speed to be set in the panning assistance mode. This correction amount, referred to as "correction amount (a)", corresponds to an amount of interferences that the shake detection unit 151 receives due to the drive of the image shake correction mechanism unit. Subsequently, the process proceeds to step S302. In step S307, the system control unit 120 does not correct the shutter speed to be set in the panning assistance mode. Next, the process proceeds to step S302.

In step S308 in FIG. 9, the system control unit 120 determines whether or not the AF (autofocus) mode is set for the focus adjustment mechanism unit of the lens device 200 based on the information acquired from the lens control unit 203. If the system control unit 120 determines that the AF mode is set, the process proceeds to step S309. If the system control unit 120 determines that the manual focus mode is set, the process proceeds to step S313.

In step S309, the system control unit 120 determines whether or not the focus adjustment mechanism unit of the lens device 200 is being driven based on the information acquired from the lens control unit 203. If the system control unit 120 determines that focus adjustment is being controlled, the process proceeds to step S310. If the system control unit 120 determines that the control of the focus adjustment has been completed and an object is in focus (in-focus state), the process proceeds to step S313. In step S310, based on the information acquired from the lens control unit 203, the system control unit 120 determines whether or not the focus lens of the lens device 200 is driven at double speed. If the lens is driven at double speed, for example, the focus lens is driven at a driving speed that is twice the predetermined value (normal speed value). If the system control unit 120 determines that the focus lens of the lens device 200 is driven at double speed, the process proceeds to step S311. If the system control unit 120 determines that the lens is driven with a normal speed value, the process proceeds to step S312.

In step S311, the system control unit 120 determines a correction amount for the shutter speed to be set in the panning assistance mode. This correction amount assumes an amount for which the shake detection unit 151 receives interferences if the lens drive unit 204 performs the double speed driving of the focus adjustment mechanism unit, which is referred to as "correction amount (b)". For ease of explanation, the correction amount (b) is twice the correction amount (a) used for the drive of the image shake correction mechanism unit. During the double speed driving, since the driving speed of the focus adjusting mechanism unit is higher than the normal speed value, the amount of vibrations caused by the drive of the focus lens increases. Due to the increase in the degree of interferences received by the shake detection unit 151, the correction amount (b) is larger than the correction amount when the focus lens is driven with the normal speed value. After step S311, the process proceeds to step S314.

In step S312, the system control unit 120 determines a correction amount for the shutter speed to be set in the panning assistance mode. This correction amount assumes an amount for which the shake detection unit 151 receives interferences if the lens drive unit 204 drives the focus adjustment mechanism unit with the normal speed value, which is referred to as "correction amount (c)". The correction amount (c) is a correction amount if the focus lens is driven with the normal speed value. For ease of explanation, the correction amount (c) is the same as the correction amount (a) to be used for the driving of the image shake mechanism unit. The correction amount (b) is twice the correction amount (c). After step S312, the process proceeds to step S315.

In step S313, the system control unit 120 does not perform the correction to the shutter speed to be set in the panning assistance mode based on the drive of the focus adjustment mechanism unit. Specifically, a correction amount in which an amount of interferences with the shake detection unit 151 caused by the driving of the focus lens by the lens drive unit 204 is assumed is not added. After step S313, the process proceeds to step S316.

Each of steps S314, S315, and S316 is a process of determining whether or not a correction amount in which an amount of interferences with the shake detection unit 151 caused by the driving of the image shake correction mechanism unit is assumed is to be added, in other words, a process of determining whether or not the correction amount (a) is to be added. In step S314, if it is determined that the correction amount (a) is to be added (YES), the process proceeds to step S317, and if it is determined that the correction amount (a) is not to be added (NO), the process proceeds to step S318. In step S315, if it is determined that the correction amount (a) is to be added (YES), the process proceeds to step S318, and if it is determined that the correction amount (a) is not to be added (NO), the process proceeds to step S319. In step S316, if it is determined that the correction amount (a) is to be added (YES), the process proceeds to step S319, and if it is determined that the correction amount (a) is not to be added (NO), the process proceeds to step S320.

In step S317, the system control unit 120 calculates a shutter speed to be set in the panning assistance mode. At that time, the calculation process is executed by using the correction coefficient A for the panning angular velocity that has been detected by the shake detection unit 151. In this case, the correction amount is an amount obtained by adding the correction amount (b) to the correction amount (a), that is, three times the correction amount (a).

In step S318, the system control unit 120 calculates a shutter speed to be set in the panning assistance mode. At that time, the calculation process is executed by using the correction coefficient B for the panning angular velocity that has been detected by the shake detection unit 151. In this case, the correction amount is an amount obtained by adding the correction amount (c) to the correction amount (a), that is, twice the correction amount (a), which is equal to the correction amount (b). In step S319, the system control unit 120 calculates a shutter speed to be set in the panning assistance mode. At that time, the calculation process is executed by using the correction coefficient C for the panning angular velocity that has been detected by the shake detector 151. In this case, the correction amount is the correction amount (a), which is equal to the correction amount (c).

In step S320, the system control unit 120 does not correct the shutter speed to be set in the panning assistance mode. That is, the process of calculating the shutter speed is executed in accordance with the panning angular velocity based on the detected signals by the shake detection unit 151.

After any one process of steps S317 to S320, the process of calculating the correction of the shutter speed ends. Note that in the present embodiment, although the example in which the AF driving is performed by the driving with the normal speed value or by the double speed driving is described, the driving may be performed with three or more operation speeds.

Figure 10A:
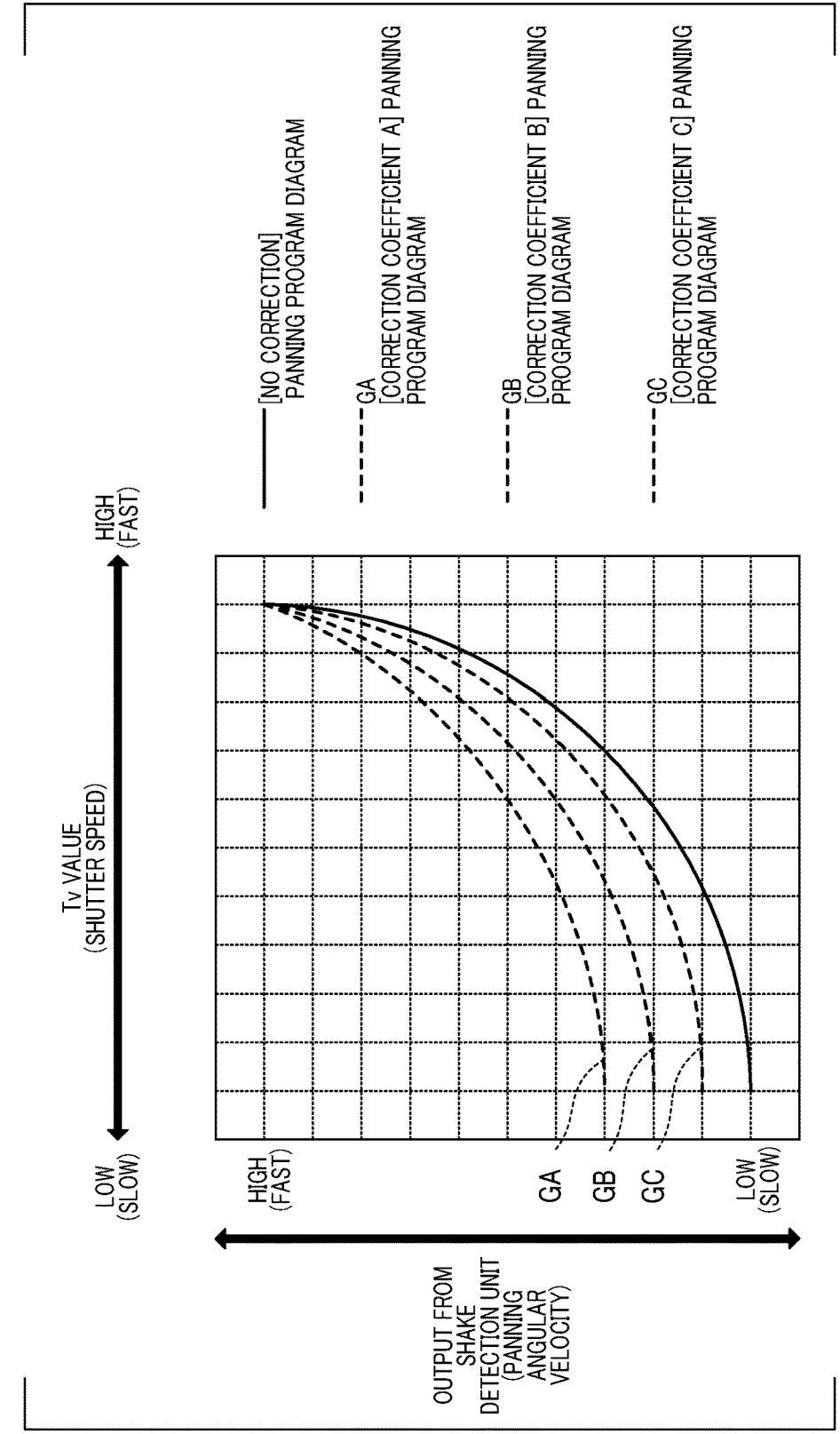

FIGS. 10A and 10B illustrate the correcting calculation for the shutter speed in the panning assistance mode. FIG. 10A illustrates the correcting calculation for the shutter speed in the present embodiment. The setting of the vertical axis and the horizontal axis is the same as that in FIGS. 5A and 5B, indicating the relation between the output of the shake detection unit and the shutter speed. The graph line shown by a solid line indicates the relation between the shake detection signals and the Tv value when interferences do not occur. The three program diagrams shown by a dotted line illustrate the relation between the shake detection signals and the Tv value when interferences occur due to the driving of the image shake mechanism unit and the focus adjustment mechanism unit. The graph curves GA, GB, and GC correspond to the program diagrams in case of each using the correction coefficients A, B, and C for each calculation in steps S317, S318, and S319 in FIG. 9.

The program diagram shown by the graph curve GA with the correction coefficient A is a diagram assuming a case in which the vibrations below affect the shake detection unit 151:
 a case in which the vibrations of the focus adjustment mechanism unit due to the double speed driving of the focus lens affect the shake detection unit 151; and
 a case in which the vibrations of the image shake correction mechanism unit due to the image shake correction control affect the shake detection unit 151.

The correction amount in these cases is three times the correction amount (a) as a result for adding the correction amount for the focus adjustment control and the correction amount for the image shake correction control.

The program diagram shown by the graph curve GB with the correction coefficient B is a diagram assuming a case in which the vibrations below affect the shake detection unit 151:
 A case in which the vibrations of the mechanism unit due to the driving of the focus lens with the normal speed value and the image shake correction control affect the shake detection unit 151; and
 A case in which the vibrations of the focus adjustment mechanism unit due to the double speed driving of the focus lens affect the shake detection unit 151.

In the former case, the correction amount is twice the correction amount (a) as a result for adding the correction amount for the focus adjustment control and the correction amount for the image shake correction control.

In the latter case, the correction amount is twice the correction amount (a) as a result for adding only the correction amount due to double speed driving of the focus lens.

The program diagram (C) shown by a graph curve with the correction coefficient C is a diagram assuming a case in which the vibrations below affect the shake detection unit 151:
 A case in which the vibrations of the focus adjustment mechanism unit due to the driving of the focus lens with a normal speed value affect the shake detection unit 151; and
 A case in which the vibrations of the image shake correction mechanism unit due to the image shake correction control affect the shake detection unit 15.

In the former case, the correction amount is the correction amount (c) for focus adjustment, which is equal to the correction amount (a).

In the latter case, the correction amount is the correction amount (a) for the image shake correction control.

FIG. 10B is a table illustrating the presence or absence of the correcting calculation for the shutter speed in the panning assistance mode and the correction coefficient and the correction amount. "Incompatible", "Stopped", "Being driven" are shown as the items of "image shake correction control". The "incompatible" indicates the lens device that is not compatible with the panning assistance. "Stopped" and "Being driven" indicate an operation state of the image shake correction mechanism unit. Additionally, as the items of the focus adjustment control, "Manual Focus", "Being Focusing (driving stopped)", "Being driven (normal driving)", and "Being driven (double speed driving)" are shown. "Manual Focus" indicates a setting state of manual focus in which a user manually performs the setting. "Being Focusing (driving stopped)" indicates a state in which the object is in focus. "Being driven (normal driving)" and "Being Driven (double speed driving)" indicate the differences in an operation speed. "Being driven (normal driving)" indicates an operation state in which the focus lens is driven at the normal speed value, "Being Driven (double speed driving)" indicates an operation state in which the focus lens is driven at a speed value that is twice the normal speed value. There are combinations, three times the correction coefficient A and the correction amount (a), twice the correction coefficient B and the correction amount (a), and the correction coefficient C and the correction amount (a). These are based on relational expressions between each correction amount, specifically, "correction amount (b)=2×correction amount (c)=2×correction amount (a)".

With reference to FIG. 11, a description will be given of an example of the calculation of the shutter speed during a panning operation of the camera. FIG. 11 illustrates the relation between the correction coefficients of the shutter speed if the shake detection unit 151 receives interferences due to the image shake correction and the focus adjustment control, and the operation state of the image shake correction mechanism unit and the focus adjustment mechanism unit. SW 2 indicates a state of the SW 2 signal of the release switch. The camera state is "being panned". "Autofocusing"

indicates a state of the focus adjustment mechanism unit, in which the state transitions in the order of "Being operating", "Being focusing", "being photographing", and "AF: Being focusing". In the image shake correction, the state of the image shake correction mechanism unit transitions in the order of "being driven", "stopped", "Being photographing", and "Being driven". "Panning angular velocity measurement" indicates a period of time for the measurement of the panning angular velocity, for which the measurement during photographing is inhibited. In the shutter speed correction setting, "Correction coefficient B", "No correction", and "Correction coefficient C" are shown. For example, if the focus adjustment mechanism is being operated (normal driving is being performed) and the image shake mechanism unit is being driven, the correction coefficient B is set (see FIG. 10B). Each of the timings for calculating the shutter speed to the shutter speed correction setting is shown, and the shutter speeds is calculated for each measurement of the panning angular velocity.

The system control unit 120 acquires information about each drive frequency of the image shake correction mechanism unit and the focus adjustment mechanism unit from the lens drive unit 204 of the lens device 200 mounted on the main body 100, and detects an operation state of the mechanism units. In accordance with the change in the operation state, a correction coefficient for the shutter speed for panning is determined, and the shutter speed is set.

In the present embodiment, if the image shake correcting mechanism unit and the focus adjusting mechanism unit are driven by the lens drive unit 204, the correcting calculation for the shutter speed is performed. Hence, it is possible to set the exposure time for a panning so that a flow amount of the background image intended by the user can be obtained in response to the operation state and the operation speed of the lens device mounted on the main body of the imaging apparatus.

According to the embodiments, if the external device such as an interchangeable lens is mounted on the main body, the control unit in the main body acquires the information about the unique drive frequency transmitted from the external device. If the external device includes the driving unit having a unique drive frequency by which the control from the control unit in the main body is impossible, the interferences with the shake detection unit in the imaging apparatus may occur due to the vibration and noise generated by the driving unit. In such a case, the control unit in the main body corrects the exposure time of the imaging element based on the drive frequency information, and thereby realizes the exposure control by which the influence of the interferences is reduced. Even in a case in which the interferences affect the shake detection unit, it is possible to obtain a captured image with a flow amount of the background image intended by the user during panning.

Other Embodiments

Although the preferred embodiments of the present invention have been described above, the present invention is not limited to the first to third embodiments, and various modifications and changes are possible within the scope of the gist thereof. In the above embodiments, although the lens device has been described as an example of external devices, any accessory may be used instead. For example, the process of correcting the shutter speed is executed by using the information about the strobe charging drive frequency acquired from the strobe unit 300 mounted on the main body. The strobe charging drive frequency is a drive frequency of a charge circuit for charging energy that causes the strobe unit 300 to emit lights. If the control unit of the main body can acquire the information about a drive frequency of the external device, a correction process based on the drive frequency is possible. Additionally, in the process of correcting the shutter speed, although an example of changing the correction coefficient by using a relational expression inversely proportional to the panning angular velocity has been described, any way of correction and any correction amount may be used. It is possible to adaptively calculate a correction amount based on the information acquired from the external device by the control unit of the main body, depending on the type of the external device to be mounted on the main body (type of interchangeable lens and the like).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-039443, filed Mar. 2, 2017 which is hereby incorporated by reference wherein in its entirety.

What is claimed is:

1. An imaging apparatus having a main body on which an external device can be mounted comprising:
   a detector configured to detect shake of the main body; and
   a controller configured to control an exposure time of an imaging unit based on a detection signal generated by the detector and drive frequency information of the external device mounted on the main body.

2. The imaging apparatus according to claim 1, wherein the controller changes the exposure time that corresponds to the detection signal in accordance with the drive frequency information.

3. The imaging apparatus according to claim 2, wherein the controller changes the exposure time that corresponds to the detection signal depending on whether or not a drive frequency of the detector interferes with the frequency indicated in the drive frequency information.

4. The imaging apparatus according to claim 3, wherein, if a difference between the drive frequency of the detector and the frequency indicated in the drive frequency information is equal to or less than a threshold value, the control unit determines that the external device mounted on the main body interferes with the detector due to the driving.

5. The imaging apparatus according to claim 4, wherein the controller changes a correction amount for the setting of the exposure time based on the difference.

6. The imaging apparatus according to claim 1, wherein the controller is configured to set a mode that supports a panning, and
   wherein, if the controller determines that a mode that supports a panning is set and panning or tilting is performed based on the detection signal, the controller sets the exposure time for the panning.

7. The imaging apparatus according to claim 6, wherein, if the controller determines that the mode that supports panning is set, and the panning or the tilting is performed, and the drive frequency of the shake detection unit interferes with the frequency indicated in the drive frequency information, the controller changes a correction amount for the setting of the exposure time in response to an angular velocity of panning or tilting detected by the detector.

8. The imaging apparatus according to claim 7, wherein the controller sets the correction amount for the setting of the exposure time in a case where the angular velocity is low so as to be larger than the correction amount for the setting of the exposure time in a case where the angular velocity is high.

9. The imaging apparatus according to claim 1, wherein the controller changes the correction amount for the setting of the exposure time in response to an operation state or an operation speed of a mechanism unit provided in the external device.

10. The imaging apparatus according to claim 9, wherein the controller sets the correction amount in a case where the operation speed is high so as to be larger than the correction amount in a case where the operation speed is low.

11. The imaging apparatus according to claim 9, wherein the mechanism unit in the external device is one of a plurality of mechanism units, and
wherein the controller sets the correction amount in a case where the mechanism units are operating so as to be larger than the correction amount in a case where one of the mechanism units is operating.

12. The imaging apparatus according to claim 11, wherein the external device includes a first mechanism unit that performs focus adjustment and a second mechanism unit that performs image shake correction,
wherein the controller sets the correction amount in a case where the first and second mechanism units are operating so as to be larger than the correction amount in a case where either the first or second mechanism unit is operating.

13. An external device that can be mounted on the main body of the imaging apparatus according to claim 1, wherein the drive frequency information is transmitted to the controller of the main body.

14. The external device according to claim 13, wherein the external device is a lens device including a mechanism unit that drives a lens.

15. The external device according to claim 14, wherein the drive frequency information includes information related to a drive frequency of the mechanism unit for driving the lens.

16. The external device according to claim 13, further comprising:
a light emitter.

17. The external device according to claim 16, wherein the drive frequency information includes information related to a drive frequency of a charging circuit for charging energy that causes the light emitter to emit lights.

18. A control method executed by an imaging apparatus having a main body on which an external device can be mounted comprising:
acquiring a detection signal about shake of the main body and drive frequency information for the external device mounted on the main body; and
controlling an exposure time of an imaging unit based on the detection signal and the drive frequency information.

* * * * *